United States Patent
Sugiyama et al.

[11] Patent Number: 5,613,921
[45] Date of Patent: Mar. 25, 1997

[54] GEAR SHIFT CONTROL APPARATUS

[75] Inventors: Hideharu Sugiyama; Ikuo Hirose; Yoshifumi Fujita, all of Shizuoka, Japan

[73] Assignee: Jatco Corporation, Fuji, Japan

[21] Appl. No.: 564,802

[22] Filed: Nov. 29, 1995

[30] Foreign Application Priority Data

Dec. 1, 1994 [JP] Japan .................. 6-298126

[51] Int. Cl.$^6$ .................................... F16H 61/16
[52] U.S. Cl. .................. 477/125; 477/156; 477/906
[58] Field of Search ................... 477/110, 115, 477/121, 156, 158, 159, 125, 906

[56] References Cited

U.S. PATENT DOCUMENTS

| | | | |
|---|---|---|---|
| 4,726,262 | 2/1988 | Hayakawa et al. | 477/125 |
| 4,846,022 | 7/1989 | Ito et al. | 477/125 |
| 4,858,501 | 8/1989 | King | 477/125 |
| 4,933,851 | 6/1990 | Ito et al. | 477/102 X |
| 4,984,484 | 1/1991 | Fujiwara et al. | 477/156 X |
| 4,991,464 | 2/1991 | Ishikawa et al. | 477/151 X |
| 5,047,935 | 9/1991 | Kashihara | 477/151 X |
| 5,109,734 | 5/1992 | Fujiwara | 477/125 X |
| 5,489,248 | 2/1996 | Tazawa | 477/156 X |
| 5,531,654 | 7/1996 | Ishikawa et al. | 477/121 X |

*Primary Examiner*—Charles A. Marmor
*Assistant Examiner*—Peter Kwon
*Attorney, Agent, or Firm*—Foley & Lardner

[57] ABSTRACT

A gear shift control apparatus for use in an automatic transmission having a friction element operable on a hydraulic pressure applied thereto in an engaged and disengaged state. A shift change control is performed to change the hydraulic pressure in a manner to produce a shift change according to a predetermined shift schedule based on transmission input and output shaft speeds and engine load. A section is provided for calculating the gear ratio obtained in the automatic transmission based on the transmission input and output shaft speeds. When a change is effected to one of highest and lowest gears or when a change is effected from one of the highest and lowest gears, a transient hydraulic pressure control of changing the hydraulic pressure from the first level to the second level is performed to change the friction element state so as to effect a shift change when the calculated gear ratio reaches a reference gear ratio. The transient hydraulic pressure control is interrupted with inhibition of any change to the highest and/or lowest gear when at least one of the first sensor, the second sensor and the gear ratio calculated section is subject to failure.

13 Claims, 10 Drawing Sheets

FIG.3

| GEAR RATIOS | FRICTION ELEMENTS | R/C | H/C | L/C | B/B | L&R/B | LOW O.W.C |
|---|---|---|---|---|---|---|---|
| R | | ○ | | | | ○ | |
| D RANGE | 1ST SPEED | | | ○ | | | ○ |
| D RANGE | 2ND SPEED | | | ○ | ○ | | |
| D RANGE | 3RD SPEED | | ○ | ○ | | | |
| D RANGE | 4TH SPEED | | ○ | | ○ | | |
| ENGINE BRAKE | 1ST SPEED | | | ○ | | ○ | (○) |
| ENGINE BRAKE | 2ND SPEED | | | ○ | ○ | | |
| ENGINE BRAKE | 3RD SPEED | | ○ | ○ | | | |
| ENGINE BRAKE | 4TH SPEED | | ○ | | ○ | | |

○ = ENGAGED

FIG.4

| GEAR POSITIONS \ SOLENOIDS | 1ST SHIFT SOLENOID | 2ND SHIFT SOLENOID |
|---|---|---|
| 1ST SPEED | ON | ON |
| 2ND SPEED | OFF | ON |
| 3RD SPEED | OFF | OFF |
| 4TH SPEED | ON | OFF |

FIG.10A
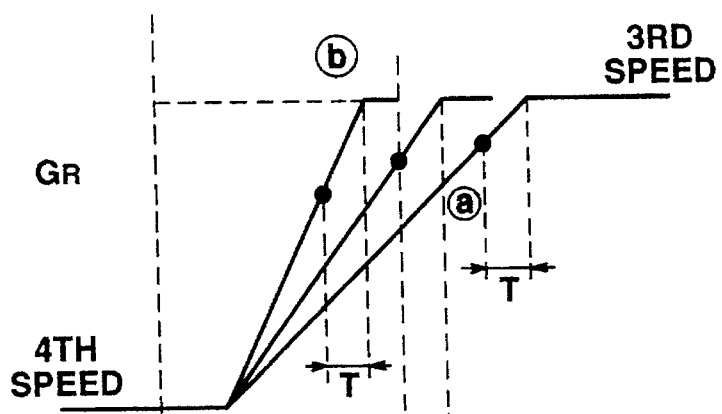
FIG.10B
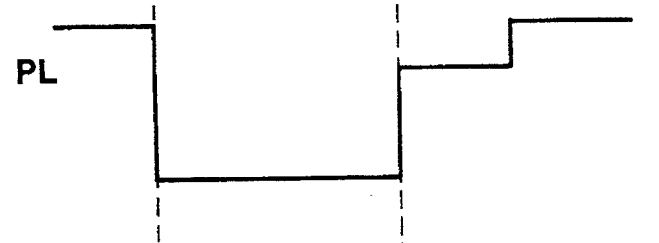
FIG.10C

GEAR SHIFT CONTROL APPARATUS

BACKGROUND OF THE INVENTION

This invention relates to a gear shift control apparatus for use with an automatic transmission having a friction element changeable into an engaged state to effect a change to a lower gear in response to a high level of hydraulic pressure applied thereto.

For example, Japanese Patent Kokai No. 6-11030 discloses a gear shift control apparatus arranged to monitor the gear ratio provided in an automatic transmission to effect a change from a higher gear to a lower gear. The automatic transmission includes a low clutch operable on a working fluid having a changeable pressure. When the gear ratio exceeds a reference value, the working fluid pressure is changed to its high level causing the low clutch to engage so as to produce a change from forth to third gear. This control is referred to as transient hydraulic pressure control. It is proposed, in this Japanese Patent Kokai, to produce such a change down at an appropriate time regardless of the working fluid temperature by increasing the reference gear ratio value as the working fluid temperature increases. The transient hydraulic pressure control is used together with gear shift control made to change the hydraulic pressure to the friction element so as to produce a gear shift according to a predetermined shift schedule.

A plurality of sensors are provided to obtain information on the gear ratio. When at least one of these sensors is subject to failure, the transient hydraulic pressure control is influenced considerably, whereas the gear shift control is not influenced. For this reason, it may be considered to interrupt the transient hydraulic pressure control while continuing the gear shift control in the event of failure of the sensors. Without the transient hydraulic pressure control, however, gear shift operations are repeated at improper hydraulic pressures during transition of a change from fourth to third gear so as to degrade the durability of the friction element.

SUMMARY OF THE INVENTION

It is a main object of the invention to provide an improved gear shift control apparatus which can eliminate the danger of damaging a friction element in the event of failure of sensors provided to monitor the gear ratio obtained in the automatic transmission, the friction element being used for a change to the highest or lowest gear when the gear ratio reaches a reference value.

Another object of the invention is to provide an improved gear shift control apparatus which can ensure proper vehicle operation in the event of failure of sensors provided to monitor the gear ratio obtained in the automatic transmission.

There is provided, in accordance with the invention, a gear shift control apparatus for use in an automotive vehicle including an internal combustion engine and an automatic transmission having an input shaft, an output shaft and a friction element operable on a hydraulic pressure applied thereto in an engaged and disengaged state. The apparatus comprises first sensor means sensitive to a speed of rotation of the transmission input shaft for producing a first sensor signal indicative of a sensed input shaft speed, second sensor means sensitive to a speed of rotation of the transmission output shaft for producing a second sensor signal indicative of a sensed output shaft speed, and third sensor means sensitive to an engine load for producing a third sensor signal indicative of a sensed engine load. The gear shift control apparatus also includes a control unit coupled to the first, second and third sensor means for performing a shift change control of changing the hydraulic pressure to produce a shift change according to a predetermined shift schedule. The control unit includes means for calculating a gear ratio obtained in the automatic transmission based on the sensed input and output shaft speeds, means responsive to one of a first change to one of highest and lowest gears and a second change from one of the highest and lowest gears for performing a transient hydraulic pressure control of changing the hydraulic pressure from the first level to the second level to change the friction element state so as to effect a shift change when the calculated gear ratio reaches a reference gear ratio, means for interrupting the transient hydraulic pressure control and inhibiting a change to the highest and/or lowest gear when at least one of the first sensor, the second sensor and the gear ratio calculating means is subject to failure.

BRIEF DESCRIPTION OF THE DRAWINGS

This invention will be described in greater detail by reference to the following description taken in connection with the accompanying drawings, in which:

FIG. 3 is a table used in explaining the engaged and disengaged states of the friction elements illustrated in FIG. 2 to effect various speed ratio changes;

FIG. 4 is a table used in explaining the ON and OFF states of the first and second shift solenoids illustrated in FIG. 1 to effect various speed ratio changes;

FIG. 10A is a graph showing changes in the gear ratio $G_R$ during a kick-down change from fourth to third gear;

FIG. 10B is a graph showing changes in the line pressure PL during a kick-down change from fourth to third gear;

FIG. 10C is a graph showing changes in the hydraulic pressure $P_{L/C}$ applied to the low clutch during a kick-down change from fourth to third gear;

DETAILED DESCRIPTION OF THE INVENTION

Figure 1:
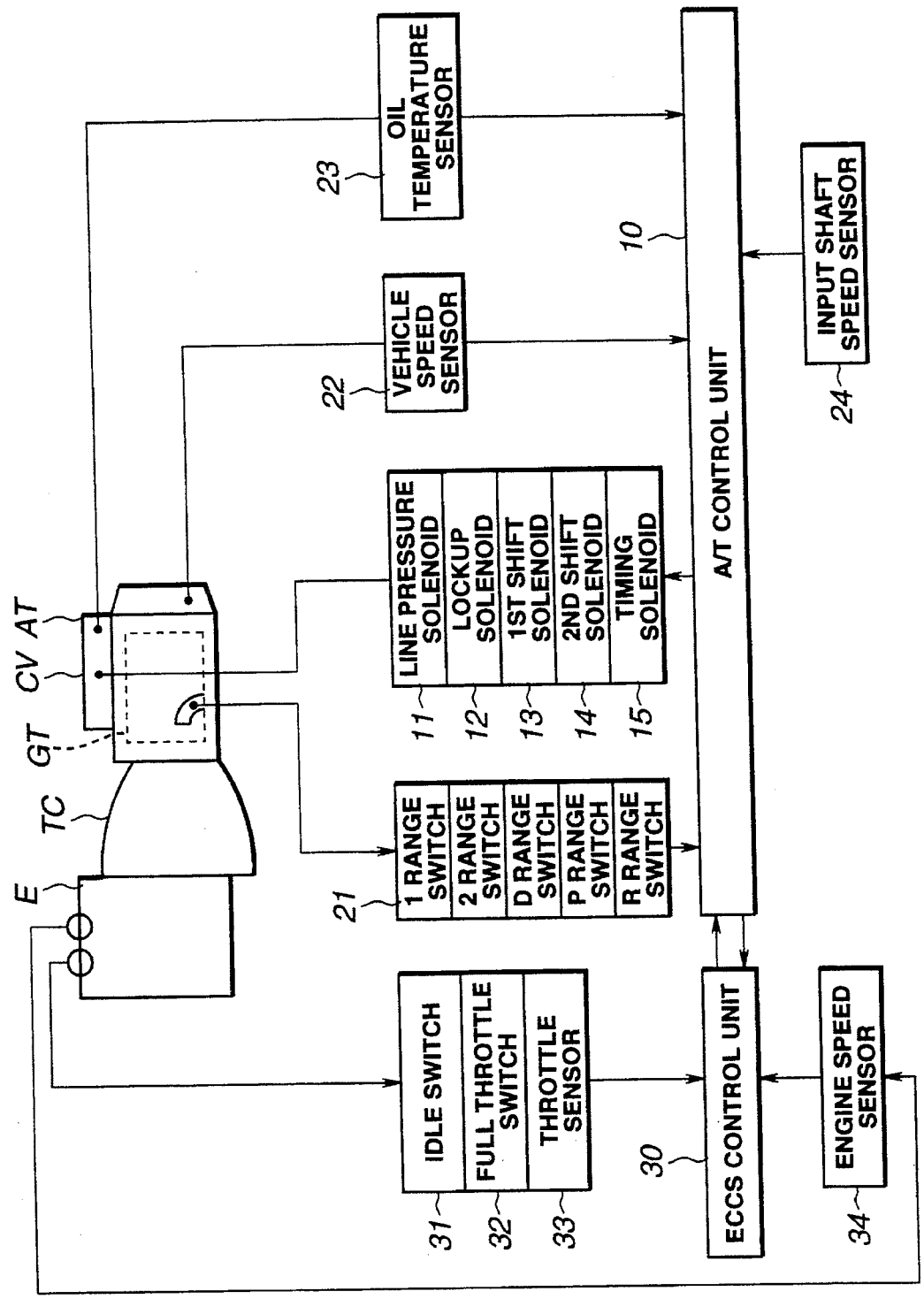
FIG. 1 is a schematic block diagram showing one embodiment of a gear shift control apparatus made in accordance with the invention.

With reference to the drawings and in particular to FIG. 1, there is shown a schematic block diagram of a gear shift control apparatus embodying the invention. The gear shift control apparatus is used with an automotive vehicle having an internal combustion engine E, and an automatic transmission AT having a torque converter TC provided with a lockup mechanism, a gear train GT to which a drive from the engine E is transmitted through the torque converter TC, and a control valve unit CV.

Figure 2:
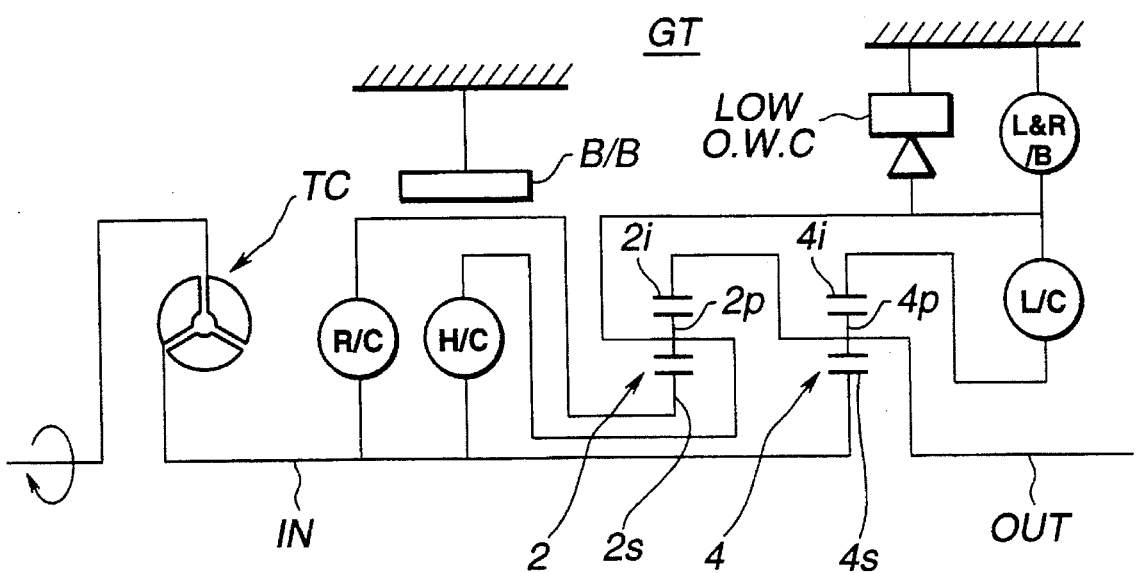
FIG. 2 is a schematic diagram showing a gear train included in the gear shift control apparatus of FIG. 1.

Referring to FIG. 2, the gear train GT includes front and rear planetary gear units 2 and 4 arranged in tandem with each other. The front planetary gear unit 2 has a front sun gear 2s, a front pinion gear 2p, a front internal gear 2i and a front carrier 2c. The rear planetary gear unit 4 has a rear planetary gear unit 4 comprised of a rear sun gear 4s, a rear pinion gear 4p, a rear internal gear 4i and a rear carrier 4c. The rear carrier 4c is coupled to the output shaft OUT. The gear train GT also has various friction elements including a reverse clutch R/C through which the front sun gear 2s is connected to the input shaft IN, a high clutch H/C through which the front carrier 2c is connected to the input shaft IN, a low clutch L/C through which the front carrier 2c is connected to the rear internal gear 4i, a band brake B/B for fixing the front sun gear 2s to the housing and a low and reverse brake L&R/B for fixing the front carrier 2c to a grounded or stationary member such as the transmission case. A one-way clutch Low/O.W.C is provided between the front carrier 2c and the housing. Each of the friction elements is switched between its engaged and disengaged states, as shown in FIG. 3, by a hydraulic fluid pressure supplied through the control valve unit CV. The one-way clutch Low/O.W.C is unlocked upon rotation of the front carrier 2c in a forward direction and it is locked upon rotation of the front carrier 2c in the reverse direction.

Returning to FIG. 1, an A/T control unit 10 is provided for controlling the automatic transmission AT. The A/T control unit 10 controls a line pressure solenoid 11, a lockup solenoid 12, a first shift solenoid 13, a second shift solenoid 14, and a timing solenoid 15 to make a gear change in the automatic transmission AT. The A/T control unit 10 effects gear changes based upon existing gear position, vehicle speed, oil temperature, and engine operating conditions. Thus, an inhibitor switch unit 21, a vehicle speed sensor 22, an oil temperature sensor 23 and an input shaft speed sensor 24 are connected to the A/T control unit 10. An idle switch 31, a full-throttle switch 32, a throttle sensor 33 and an engine speed sensor 34 are connected through a conventional ECCS control unit 30 to the A/T control unit 10. The inhibitor switch unit 21 is comprised of various automatic transmission gear position switches including a 1st range switch, a 2nd range switch, a D range switch, a P range switch and an R range switch for producing a signal indicative of the existing gear position of the automatic transmission AT. The vehicle speed sensor 22 is provided at a position for sensing the speed of rotation of the transmission output shaft. The oil temperature sensor 23 is provided for sensing the temperature of the lubrication oil. The input shaft speed sensor 24 is provided for sensing the speed of rotation of the transmission input shaft. The idle switch 31 is associated with the throttle valve situated for controlling the air flow to the engine and it produces a signal when the throttle valve is at its fully-closed position. The full-throttle switch 32 is associated with the throttle valve and it produces a signal when the throttle valve is at its fully-open position. The throttle sensor 33 is associated with the throttle valve and it produces a signal indicative of the degree of opening of the throttle valve. The engine speed sensor 34 is associated with the engine distributor and it produces a pulse signal of a repetitive rate proportional to the engine speed.

Figure 5:
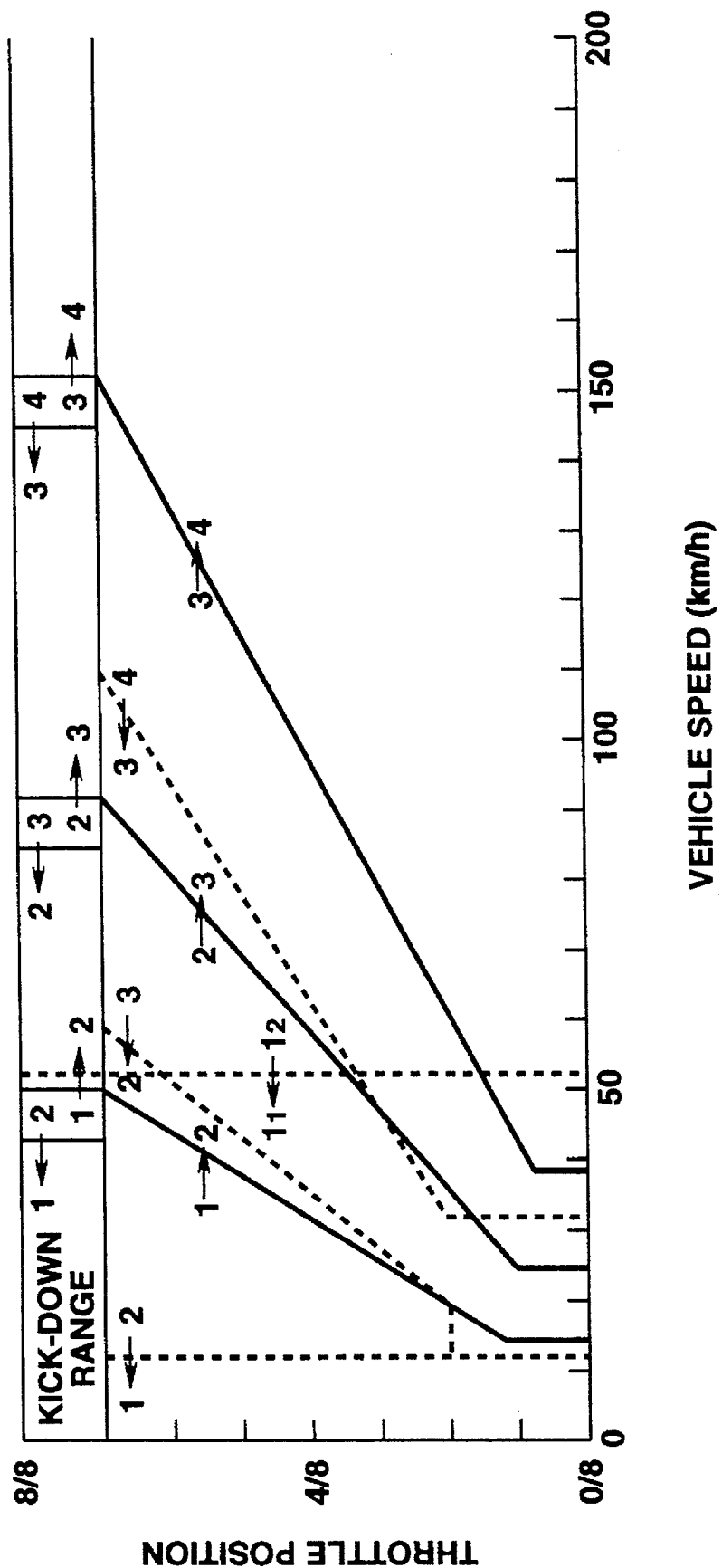
FIG. 5 is a diagram showing a shift schedule used for a shift change control made in the gear shift control apparatus of FIG. 1.

In the illustrated embodiment, the A/T control unit 10 is arranged to make a gear shift control to effect gear changes by switching the ON and OFF states of the first and second shift solenoids 13 and 14, as shown in FIG. 4. For this purpose, the A/t control unit 10 employs a shift schedule table, as shown in FIG. 5, to produce a change up command when the operation point represented by throttle valve position and vehicle speed crosses one of the change-up lines, as indicated by the solid lines of FIG. 5, and a change-down command when the operation point crosses one of the change-down lines, as indicated by the broken lines of FIG. 5. The line pressure solenoid 11 operates on a control signal having a variable pulse width or duty cycle fed from the A/T control unit 10 to provide an appropriate line pressure PL.

The A/T control unit 10 employs a digital computer which includes a center processing unit (CPU), a random access memory (RAM), a read only memory (ROM), and an input/output control unit (I/O). The central processing unit communicates with the rest of the computer via data bus. The input/output control unit includes an analog-to-digital converter which receives analog signals from the various sensors and it converts the received signal into corresponding digital signals for application to the central processing unit. The read only memory contains the programs for operating the central processing unit. The random access memory contains appropriate data in look-up tables (relationship) used for the operation of changing gear.

Figure 6:
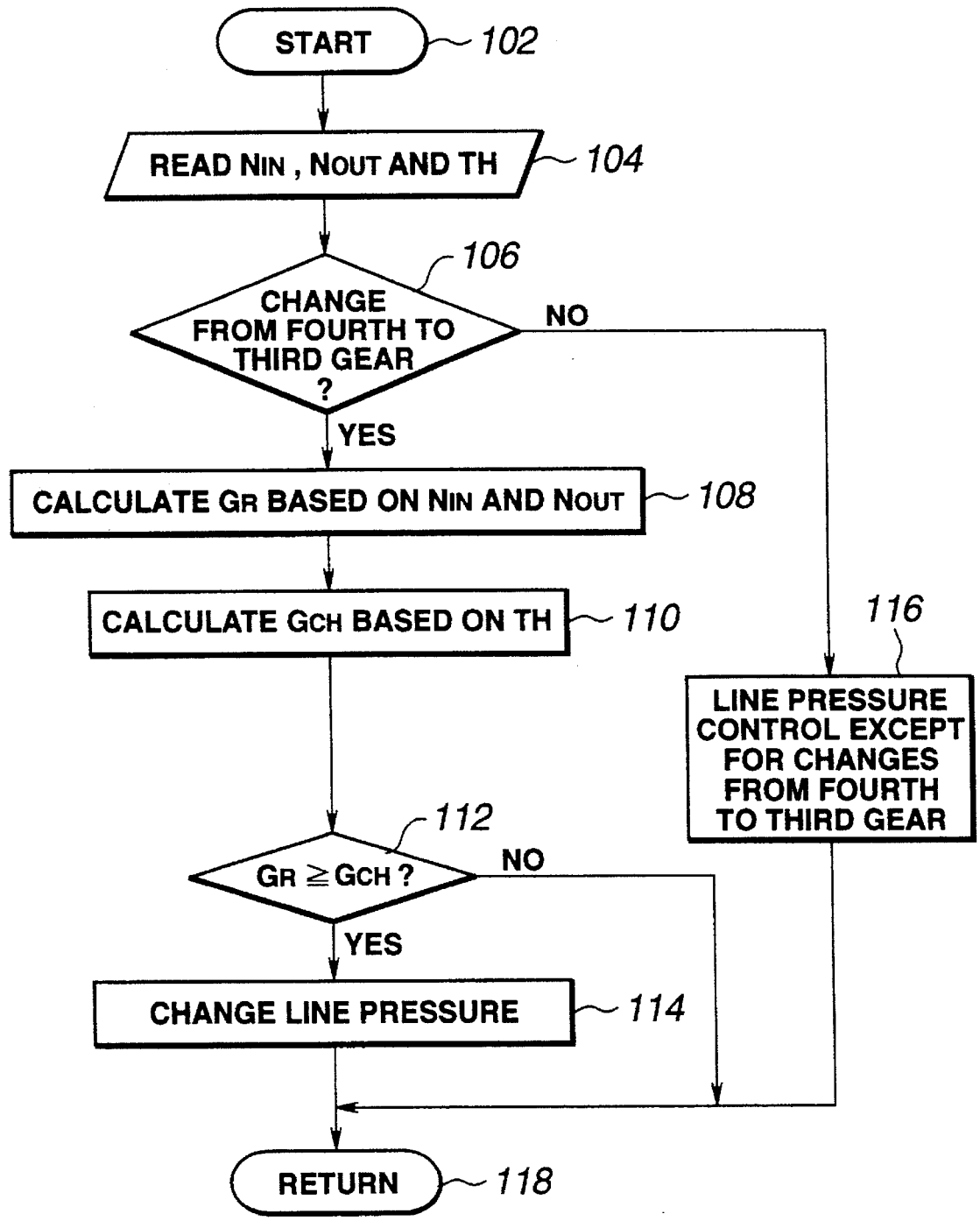
FIG. 6 is a flow diagram illustrating the programming of the digital computer as it is used for a transient hydraulic pressure control.

FIG. 6 is a flow diagram illustrating the programming of the digital computer as it is used for a transient hydraulic pressure control made during the gear shift control made in the A/T control unit 10. The computer program is entered at the point 102. At the point 104 in the program, the transmission input and output shaft speeds $N_{IN}$ and $N_{OUT}$ and the engine throttle valve position TH are read into the computer program. The input shaft speed $N_{IN}$ is indicated by the signal fed from the input shaft speed sensor 24, the output shaft speed $N_{OUT}$ is indicated by the signal fed from the vehicle speed sensor 22, and the throttle valve position TH is indicated by the signal fed from the throttle position sensor 33. At the point 106, a determination is made as to whether or not a change-down command is produced for the shift change from fourth to third gear. If the answer to this question is "yes", then the program proceeds to the point 108. Otherwise, the program proceeds to the point 116 where line pressure controls are effected except for the shift change from four to third gear. Following this, the program proceeds to the point 118 where the computer program is returned to the point 104.

Figure 7:
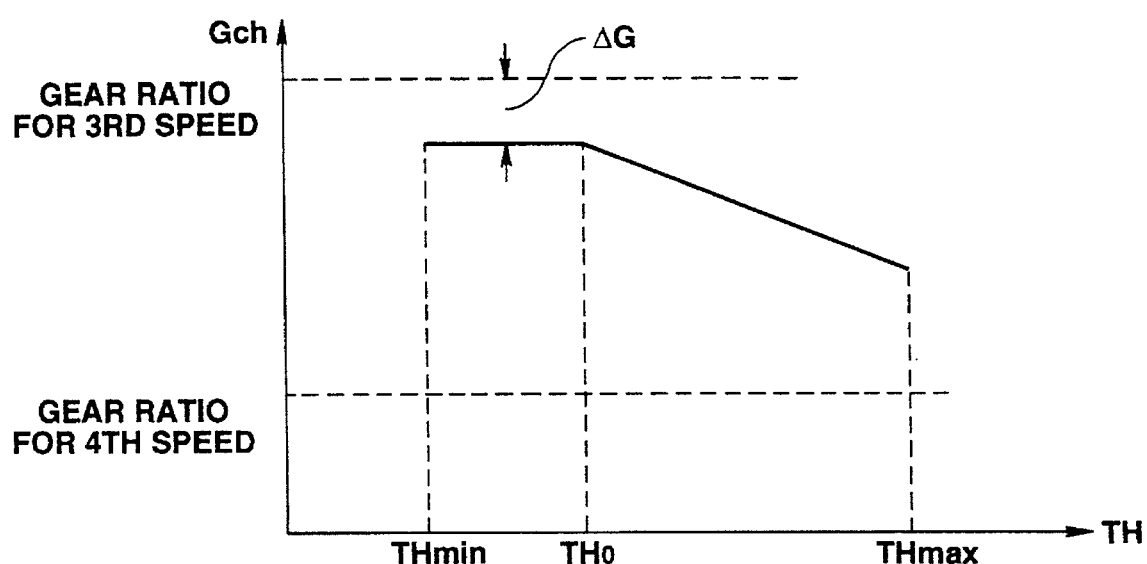
FIG. 7 is a graph of reference gear ratio $G_{ch}$ versus throttle valve position TH.

At the point 108 in the program, the actual gear ratio $G_R$ provided in the automatic transmission AT is calculated based on the read input and output shaft speeds $N_{IN}$ and $N_{OUT}$ as $G_R=N_{IN}/N_{OUT}$. At the point 110, a reference gear ratio $G_{ch}$ is calculated from a relationship programmed into the computer. This relationship defines the reference gear ratio $G_{ch}$ as a function of throttle valve position TH, as shown in FIG. 7. The characters THmax and THmin designate the upper and lower limits which define the throttle valve position range in which the change-down command is produced for the shift change from fourth to third gear. The reference gear ratio $G_{ch}$ is fixed at its maximum value when the throttle valve position TH is in the range of THmin to THo and it decreases as the throttle valve position TH increases when the throttle valve position TH is in the range of THo to THmax.

At the point 112 in the program, a determination is made as to whether or not the actual gear ratio $G_R$ is equal to or greater than the calculated reference gear ratio $G_{ch}$. If the answer to this question is "yes", then the program proceeds to the point 114 where a command is produced to change the line pressure PL from a low level to a high level to increase the pressure introduced into the low clutch L/C and then to the point 118. Otherwise, the program proceeds directly to the point 118.

Figure 8:
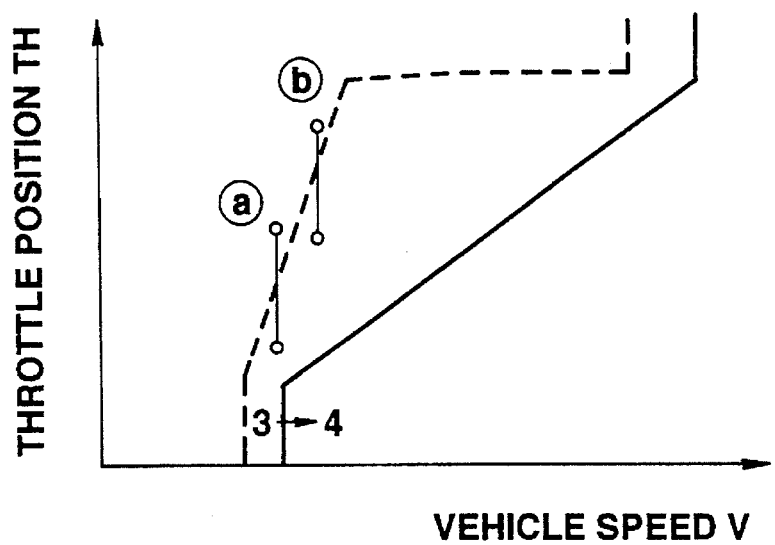
FIG. 8 is a diagram showing a shift schedule used for changes from fourth to third gear.
Figure 9:
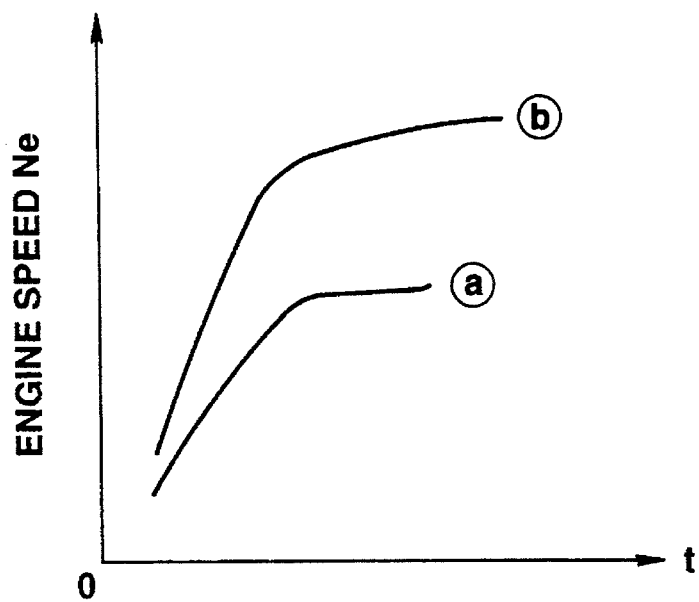
FIG. 9 is a graph showing engine speed changes.

Description will be made to kick-down changes (a) and (b) effected from fourth to third gear at wider and narrower throttle valve positions, as shown in FIG. 8. As described in connection with FIG. 7, the reference gear ratio $G_{ch}$ has small and great values for the narrow and wide throttle valve positions, respectively. Fourth gear is given when the high clutch H/C is engaged and the band brake B/B is engaged. As can be seen from FIG. 9, the response speed, that is, the rate of change of the engine speed Ne is greater when a kick-down change from fourth to third gear is produced at a wide throttle valve position, as indicated by the curve b of FIG. 9, than when a kick-down change from fourth to third gear is produced at a narrow throttle valve position, as indicative by the curve a of FIG. 9. For this reason, the engine will race if the time at which the hydraulic pressure to the low clutch changes to its high level is retarded with respect to an appropriate time at a wide throttle valve position. On the other hand, shocks will be produced if the time at which the hydraulic pressure to the low clutch changes to its high level is advanced with respect to an appropriate time at a narrow throttle valve position.

When a kick-down change is effected at a narrower throttle valve position, as indicated by the arrow (a) of FIG. 8, the reference gear change $G_{ch}$ is set at a great value. For this reason, the actual gear ratio $G_R$ will reach the reference gear change $G_R$ and thus the command is produced to increase the line pressure PL in a long time after the change-down command is produced for the shift change from fourth to third gear. Assuming now that the time T required to engage the low clutch L/C from the time at which the line pressure PL is changed to a high level is constant, as shown in FIG. 10A, the timing of production of the command to increase the line pressure PL is retarded. This is effective to prevent shocks during the gear shift operation.

When a kick-down change is effected at a middle throttle valve position, the reference gear change $G_{ch}$ is set at a middle value. For this reason, the actual gear ratio $G_R$ will reach the reference gear change $G_R$ and thus the command is produced to increase the line pressure PL in an appropriate time after the change-down command is produced for the shift change from fourth to third gear. Assuming now that the time T required to engage the low clutch L/C from the time at which the line pressure PL is changed to a high level is constant, as shown in FIG. 10A, the timing of production of the command to increase the line pressure PL is appropriate. FIG. 10B shows changes in the line pressure PL and FIG. 10C shows changes in the pressure $P_{L/C}$ introduced in to the low clutch L/C. As can be seen from FIGS. 10A, 10B and 10C, the time at which the low clutch L/C is engaged, that is, the time T plus the time at which the command is produced to increase the line pressure PL, agrees well with the time at which third gear is given. This is effective to provide a good gear change feel with no engine racing and no shock.

When a kick-down change is effected at a wider throttle valve position, as indicated by the arrow (b) of FIG. 8, the reference gear change $G_{ch}$ is set at a small value. For this reason, the actual gear ratio $G_R$ will reach the reference gear change $G_R$ and thus the command is produced to increase the line pressure PL in a short time after the change-down command is produced for the shift change from fourth to third gear. Assuming now that the time T required to engage the low clutch L/C from the time at which the line pressure PL is changed to a high level is constant, as shown in FIG. 10A, the timing of production of the command to increase the line pressure PL is advanced. This is effective to prevent the engine from racing.

Figure 11:
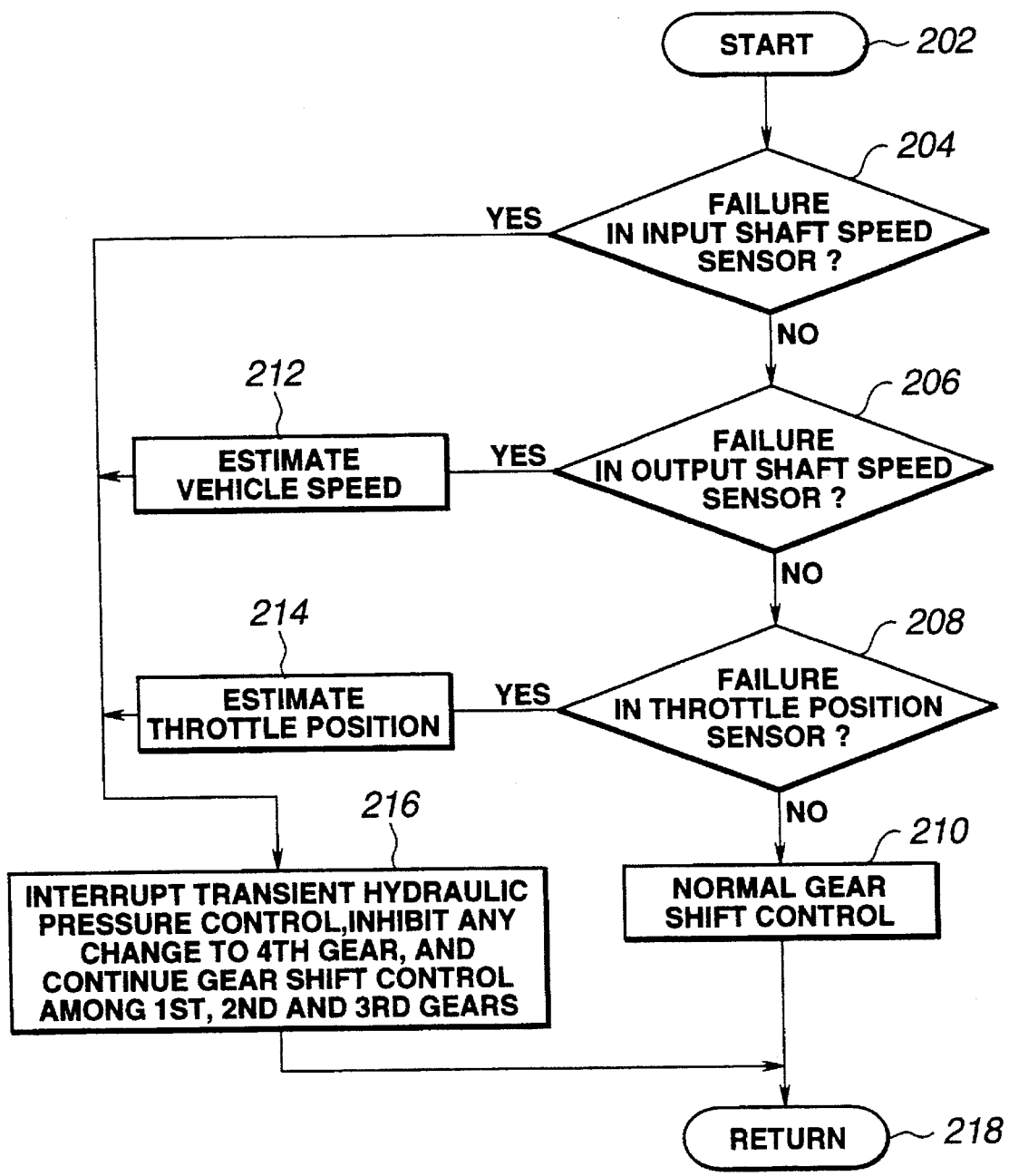
FIG. 11 is a flow diagram illustrating a modified form of thee programming of the digital computer as it is used in the event of sensors provided to monitor the gear ratio obtained in the automatic transmission.

FIG. 11 is a flow diagram illustrating the programming of the digital computer as it is used for line pressure control in the event of failure of at least one of the sensors which produce information on the gear ratio provided in the automatic transmission. The computer program is entered at the point 202. At the point 204 in the program, a determination is made as to whether or not the input shaft speed sensor 24 is subject to failure. If the answer to this question is "yes", then the program proceeds to the point 216. Otherwise, the program proceeds to another determination step at the point 206. This determination is as to whether or not the output shaft speed sensor 22 is subject to a failure. If the answer to this question is "yes", then the program proceeds to the point 212. At the point 212 in the program, the vehicle speed is estimated in one of the manners as follows:

(1) The vehicle speed is estimated based on the sensed input shaft speed and the detected gear position. The gear position is detected based on the states of the commands fed to the first and second shift solenoids 13 and 14.

(2) The vehicle speed is estimated based on the sensed output shaft speed.

(3) The vehicle speed is estimated as a fixed value existing in an average vehicle speed range.

Upon completion of the vehicle speed estimation, the program proceeds to the point 216. If the answer to the question inputted at the point 206 is "no", then the program proceeds to another determination step at the point 208. This determination is as to whether or not the throttle valve position sensor 33 is subject to a failure If the answer to this question is "yes", then the program proceeds to the point 214. At the point 214 in the program, the throttle valve position is estimated in one of the manners as follows:

(1) The throttle valve position is estimated based on the sensed engine load.

(2) The throttle valve position is estimated as a fixed value existing in an average throttle valve position range.

Upon completion of the throttle valve position estimation, the program proceeds to the point 216. If the answer to the question inputted at the point 208 is "no", then it means that all of the sensors operate in order and the program proceeds to the point 210 where the central processing unit produces a command to perform a normal gear shift control including the transient hydraulic pressure control to produce a change from fourth to third gear. Following this, the program proceeds to the point 218 where the computer program is returned to the point 204.

At the point 216 in the program, the central processing unit produces a command to interrupt the transient hydraulic pressure control (FIG. 6), inhibit any change to the fourth gear and continue the automatic gear shift control to produce changes among the first, second and third gears. Following this, the program proceeds to the point 218.

Figure 12:
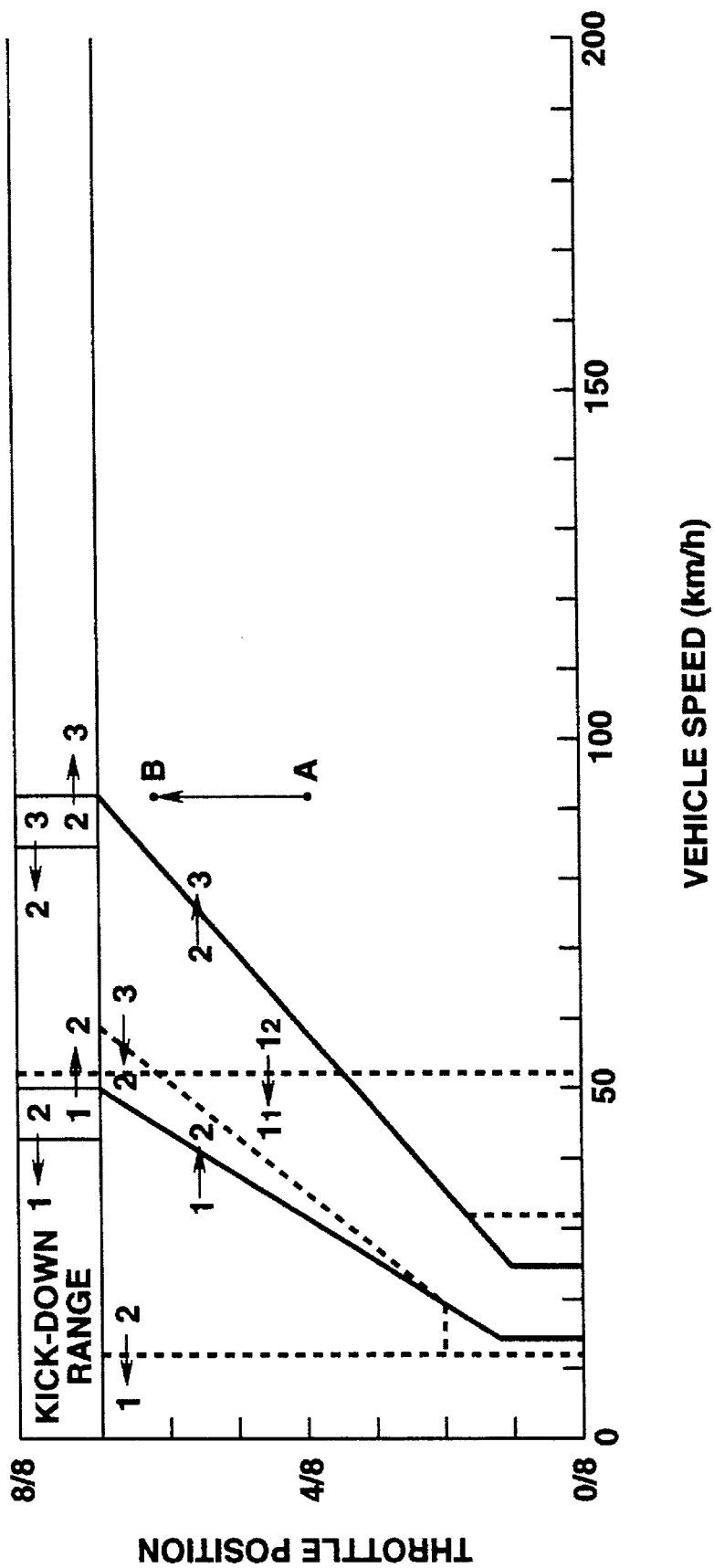
FIG. 12 is a diagrams showing a shift schedule used for a shift change control made in the event of failure of the sensors provided to monitor the gear ratio obtained in the automatic transmission.

In the event of failure of the input shaft sensor 24, the control unit interrupts the transient hydraulic pressure control using a gear ratio at which a change is made from fourth to third gear and also inhibits any change to the fourth gear. When the vehicle speed and throttle valve position sensors 22 and 33 are operating in order, the automatic gear shift control is permitted to continue among the first, second and third gears, as shown in FIG. 12. In this case, the vehicle sensor 22 and the throttle valve position sensor 33 are used to ensure proper vehicle operation.

In the event of failure of the vehicle speed sensor 22, the control unit interrupts the transient hydraulic pressure control using a gear ratio at which a change is made from fourth to third gear and also inhibits any change to the fourth gear. When the throttle valve position sensor 33 is operating in order, the automatic gear shift control is permitted to continue among the first, second and third gears, as shown in FIG. 12, with the use of the vehicle speed estimated at the point 212 of FIG. 11. In this case, the vehicle speed is estimated based on information obtained from sensors except for the vehicle speed sensor 22 to ensure proper vehicle operation.

In the event of failure of the throttle valve position sensor 33, the control unit interrupts the transient hydraulic pressure control using a gear ratio at which a change is made from fourth to third gear and also inhibits any change to the fourth gear. When the vehicle speed sensor 22 is operating in order, the automatic gear shift control is permitted to continue among the first, second and third gears, as shown in FIG. 12, with the use of the throttle valve position estimated at the point 214 of FIG. 11. In this case, the throttle valve position is estimated based on information obtained from sensors except for the throttle valve position sensor 33 to ensure proper vehicle operation.

The transient hydraulic pressure control for a change from fourth to third gear requires information from the input shaft speed sensor 24, the vehicle speed sensor 22 and the throttle valve position sensor 33. In the event of failure of at least one of the input shaft speed sensor 24, the vehicle speed sensor 22 and the throttle valve position sensor 33, therefore, the transient hydraulic pressure control is interrupted. This is effective to prevent a bad feel during the gear shift operation. Furthermore, any change to the fourth gear is inhibited. This is effective to prevent the low clutch L/C to engage repetitively at improper times so as to degrade the durability.

Assuming now that the sensors 22, 24 and 33 are operating in order, a change from fourth to third gear is produced when the accelerator pedal is depressed from the point A to the point B (FIG. 5). In the event of failure of at least one of the sensors 24, 22 and 33, the automatic gear shift control continues among the first, second and third gears. In this case, no change occurs to the fourth gear even though the accelerator pedal is depressed from the point A to the point B, as shown in FIG. 12.

While the invention has been described in connection with a control unit arranged to control the hydraulic pressure introduced into the low clutch by changing the line pressure in a manner to control the accumulator back pressure, it is to be understood, of course, that the control unit may be arranged to control a solenoid valve through which the low clutch is supplied with pressure. While the reference gear ratio is calculated as a function of throttle valve position, it is to be understood that the reference gear ratio may be calculated as a function of at least one of speed related parameters including transmission input shaft speed, engine speed and the like which determines the rate of change of the gear ratio during a change from a higher gear to a lower gear. While the invention has been described in connection with inhibition of any change to the fourth gear, it is to be understood that any change to the highest or lowest gear is inhibited in the event of failure of at least one of the sensors 22, 24 and 33. While the invention has been described in connection with means for interrupting the transient hydraulic pressure control and inhibiting a change to the highest and/or lowest gear when at least one of the first and second sensors is subject to failure, it is to be understood that this operation may be made when at least one of the first sensor, the second sensor and the gear ratio calculating means is subject to failure. While the invention has been described in conjunction with specific embodiments thereof, it is evident that many alternatives, modifications and variations will be apparent to those skilled in the art. Accordingly, it is intended to embrace all alternatives, modifications and variations that fall within the scope of the appended claims.

What is claimed is:

1. A gear shift control apparatus for use in an automotive vehicle including an internal combustion engine and an automatic transmission having an input shaft, an output shaft and a friction element operable on a hydraulic pressure applied thereto in an engaged and disengaged state, the apparatus comprising:

first sensor means sensitive to a speed of rotation of the transmission input shaft for producing a first sensor signal indicative of a sensed input shaft speed;

second sensor means sensitive to a speed of rotation of the transmission output shaft for producing a second sensor signal indicative of a sensed output shaft speed;

third sensor means sensitive to an engine load for producing a third sensor signal indicative of a sensed engine load; and a control unit couple to the first, second and third sensor means for performing a shift change control of changing the hydraulic pressure to produce a shift change according to a predetermined shift schedule, the control unit including means for calculating a gear ratio obtained in the automatic transmission based on the sensed input and output shaft speeds, means responsive to one of a first change to one of highest and lowest gears and a second change from one of the highest and lowest gears for performing a transient hydraulic pressure control of changing the hydraulic pressure from the first level to the second level to change the friction element state so as to effect a shift change when the calculated gear ratio reaches a reference gear ratio, means for interrupting the transient hydraulic pressure control and inhibiting a change to the highest and/or lowest gear when at least one of the first sensor, the second sensor and the gear ratio calculating means is subject to failure.

2. The gear shift control apparatus as claimed in claim 1, wherein the control unit includes means for calculating a vehicle speed based on the sensed output shaft speed, and means for calculating a gear to which a change is to be effected from the predetermined shift schedule based on the sensed engine load and the calculated engine speed.

3. The gear shift control apparatus as claimed in claim 2, wherein the control unit includes means for estimating the vehicle speed based on the sensed input shaft speed in the event of failure of the second sensor means, and means for continuing the shift change control with the estimated vehicles speed.

4. The gear shift control apparatus as claimed in claim 2, further including sensor means sensitive to a vehicle operating parameter related to transmission output shaft speed for producing a sensor signal indicative of a sensed vehicle operating parameter wherein the control unit includes means for estimating the vehicle speed based on the sensed vehicle operating parameter in the event of failure of the second sensor means, and means for continuing the shift change control with the estimated engine load.

5. The gear shift control apparatus as claimed in claim 2, wherein the control unit includes means for setting the vehicle speed at a predetermined value in the event of failure of the second sensor means, and means for continuing the shift change control with the set vehicle speed.

6. The gear shift control apparatus as claimed in claim 2, wherein the control unit includes means for calculating the reference gear ratio based on the sensed engine load.

7. The gear shift control apparatus as claimed in claim 6, wherein the control unit includes means for interrupting the transient hydraulic pressure control and inhibiting a change to a highest and/or lowest gear when at least one of the first, second and third sensors is subject to failure.

8. The gear shift control apparatus as claimed in claim 7, further including sensor means sensitive to an engine operating parameter related to engine load for producing a sensor signal indicative of a sensed engine operating parameter wherein the control unit includes means for estimating the engine load based on the sensed engine operating parameter in the event of failure of the third sensor means, and means for continuing the shift change control with the estimated engine load.

9. The gear shift control apparatus as claimed in claim 7, wherein the control unit includes means for setting the engine load at a predetermined value in the event of failure of the third sensor means, and means for continuing the shift change control with the set engine load.

10. The gear shift control apparatus as claimed in claim 1, wherein the control unit includes means for calculating the reference gear ratio based on the sensed engine load.

11. The gear shift control apparatus as claimed in claim 10, wherein the control unit includes means for interrupting the transient hydraulic pressure control and inhibiting a change to a highest and/or lowest gear when at least one of the first, second and third sensors is subject to failure.

12. The gear shift control apparatus as claimed in claim 11, further including sensor means sensitive to an engine operating parameter related to engine load for producing a sensor signal indicative of a sensed engine operating parameter wherein the control unit includes means for estimating the engine load based on the sensed engine operating parameter in the event of failure of the third sensor means, and means for continuing the shift change control with the estimated engine load.

13. The gear shift control apparatus as claimed in claim 11, wherein the control unit includes means for setting the engine load at a predetermined value in the event of failure of the third sensor means, and means for continuing the shift change control with the set engine load.

* * * * *